United States Patent

Fong et al.

[11] Patent Number: 5,987,231
[45] Date of Patent: Nov. 16, 1999

[54] METHOD OF PRINTING USER INPUT DATA ON PREPRINTED FORMS

[75] Inventors: Ludia Fong, North York; Edward E. Pascal, Nepean, both of Canada

[73] Assignee: Ludia Fong, North York, Canada

[21] Appl. No.: 08/847,587

[22] Filed: Apr. 24, 1997

[51] Int. Cl.[6] .................................................. G06K 15/00
[52] U.S. Cl. .......................................... 395/117; 395/101
[58] Field of Search ..................................... 395/101, 106, 395/117, 112; 707/500, 505, 506, 507, 508, 522, 523; 358/448, 403, 467

[56] References Cited

U.S. PATENT DOCUMENTS 4,809,220  2/1989  Carlson et al. .......................... 395/117
5,625,465  4/1997  Lech et al. ............................. 358/448

Primary Examiner—Arthur G. Evans
Attorney, Agent, or Firm—Pascal & Associates

[57] ABSTRACT

A method of printing user data on a preprinted form comprising: scanning a preprinted form into a computer, and storing pixel data representing the form in a memory, indicating and storing the coordinates of data entry spaces of the scanned form, entering data into the computer at displayed locations within at least one of the indicated data entry spaces, and storing said data, inserting said preprinted form into a printer, and printing the entered data on the preprinted form within locations indicated by said coordinates.

8 Claims, 3 Drawing Sheets

METHOD OF PRINTING USER INPUT DATA ON PREPRINTED FORMS

FIELD OF THE INVENTION

This invention relates to the field of computer systems, and in particular to a system for controlling the receipt of typed information which is to be added to a form, and printing the information.

BACKGROUND TO THE INVENTION

In the past, information to be added to a preprinted form was required to be printed on the form by hand or typed into spaces provided on the form. Since personal computers came into widespread use, some forms have been provided in software. An example of this is income tax software, which allows a user to bring up forms which emulate preprinted government forms on a computer display, and then to enter the required information in designated spaces. The forms with the data which has been entered can then be printed on a computer printer.

However, the design of such form is required to be programmed, and it has been a tedious and sometimes difficult task to design the forms in software to exactly mimic the officially printed forms on the display, when printed.

SUMMARY OF THE INVENTION

The present invention provides a simple method for easily providing display of virtually any form on a computer display, to provide locations for user information to be input, to print only the user information on a corresponding already existing preprinted form that may be loaded into a printer, or to print the entire form with the entered user information.

The forms need not be programmed into the computer, saving substantial cost, and avoiding the requirement for the forms supplier and/or the user to hire a programmer.

In accordance with an embodiment of the invention, a method of printing user data on a preprinted form comprises (a) scanning a preprinted form into a computer, and storing pixel data representing the form in a memory, (b) indicating and storing coordinates of data entry spaces of the scanned form, (c) entering data into the computer at displayed locations within at least one of the indicated data entry spaces, and storing the data, (d) inserting the preprinted form into a printer, and (e) printing the entered data on the preprinted form within locations defined by the coordinates.

Preferably the coordinates of the data entry spaces are indicated by pointing and clicking, using a computer pointing device, at beginning and end points of data entry locations on a displayed scanned image of the preprinted form on the computer display. Alternatively the indicating step can be dragging a pointing device over a data entry space to define boundaries of data entry locations on a displayed scanned image of the preprinted form on the computer display.

BRIEF INTRODUCTION TO THE DRAWINGS

A better understanding of the invention will be obtained by considering the detailed description below, with reference to the following drawings, in which:

FIG. 1 is a block diagram of the architecture of a computer on which the present invention may be carried out, FIGS. 2A and 2B are diagrams of a part of a memory used in accordance with an embodiment of the invention, and FIGS. 3A and 3B together form a flow chart of an embodiment of the invention, assembled as indicated in FIG. 4.

DETAILED DESCRIPTION OF THE INVENTION

Figure 1:
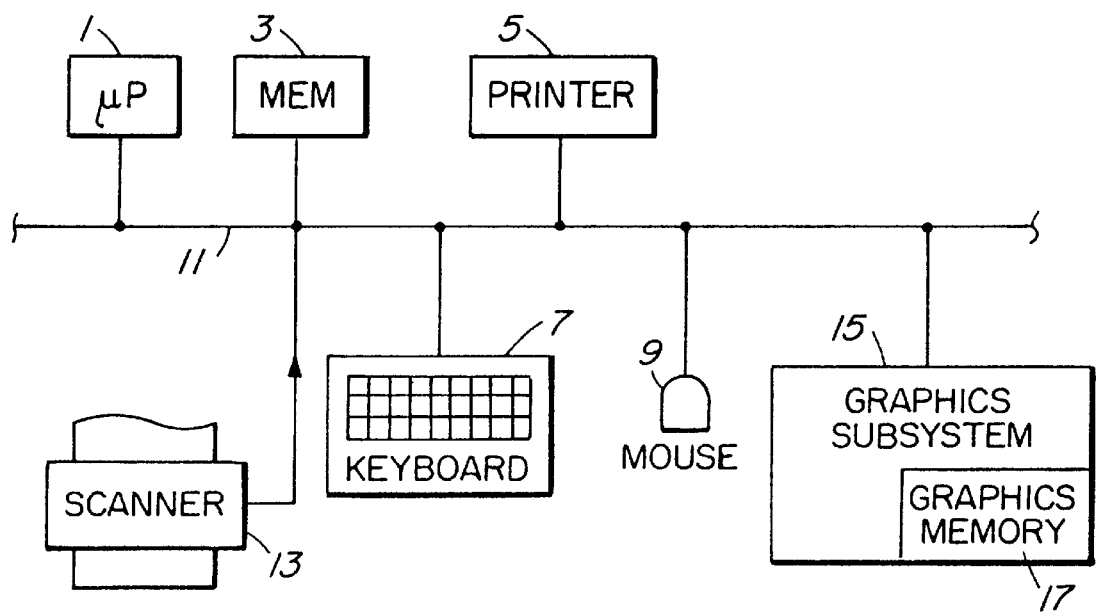

Turning to FIG. 1, the basic architecture of a personal computer is illustrated. A microprocessor 1, a random access memory (RAM) 3, a printer 5, a keyboard 7 and a pointer and cursor control such as a mouse 9 are connected to an expansion bus 11. A scanner 13 is also connected to bus 11. A graphics subsystem 15 is also in communication with bus 11, containing a graphics memory 17.

The processor 1 controls operation of the computer by accessing programs stored in memory 3, using control signals and/or data entered using the keyboard and/or mouse 9, and can control printing by printer 5 using printer driver programs stored in memory 3.

The processor also can control scanner 13 and receive pixel data input therefrom using a scanner control program, such as Phototouch Color, sold by Logitech. Pixel data can be stored in memory 3, or more preferably in memory 17.

Figure 2A:
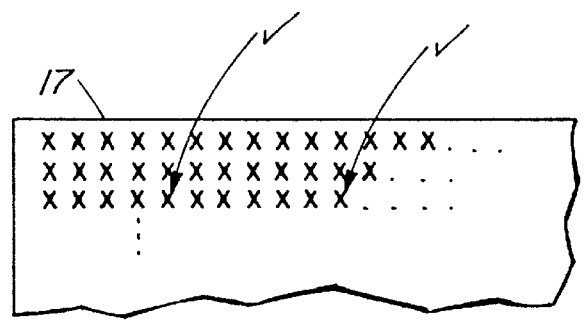
Figure 3B:
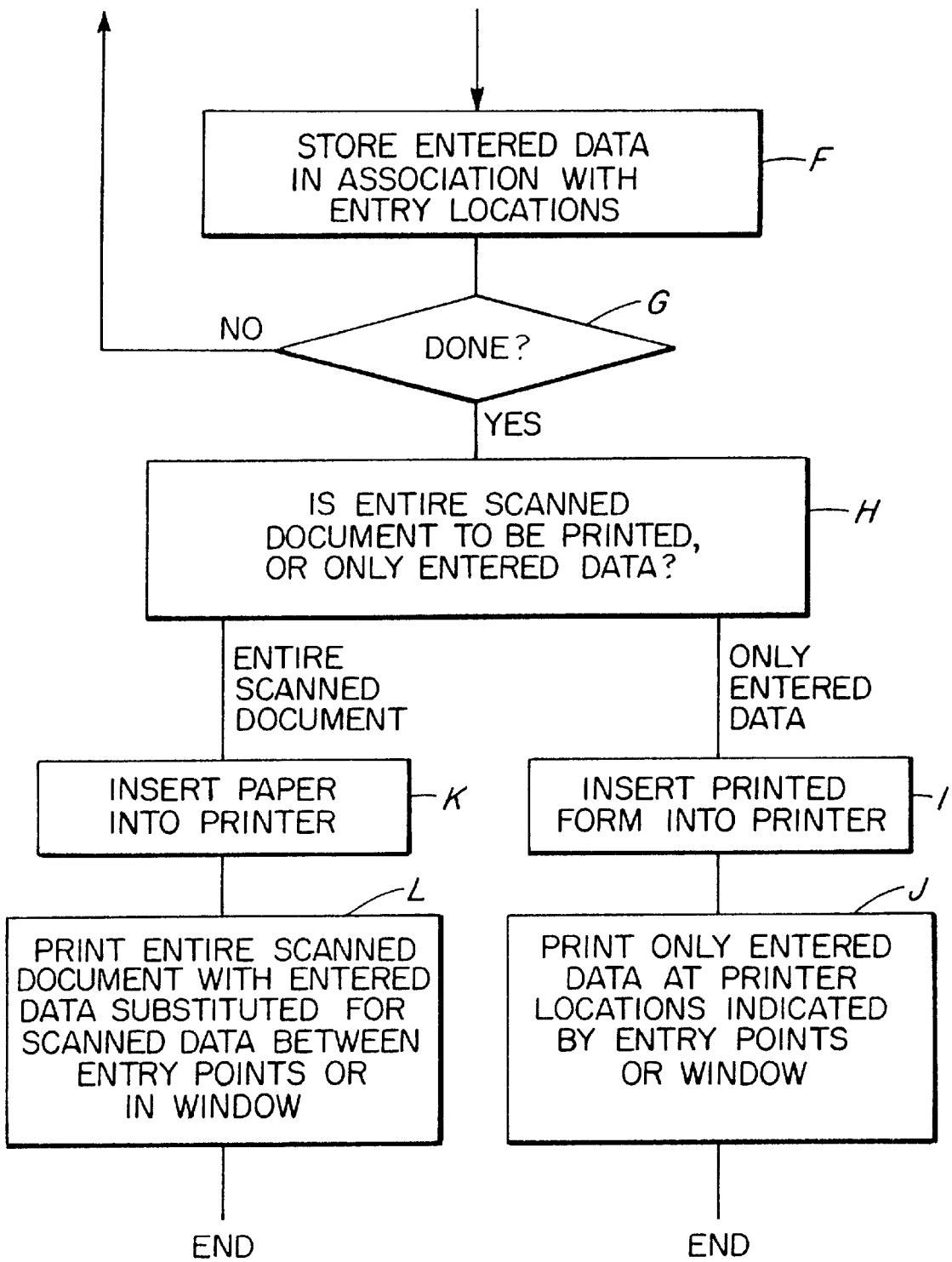
Figure 3A:
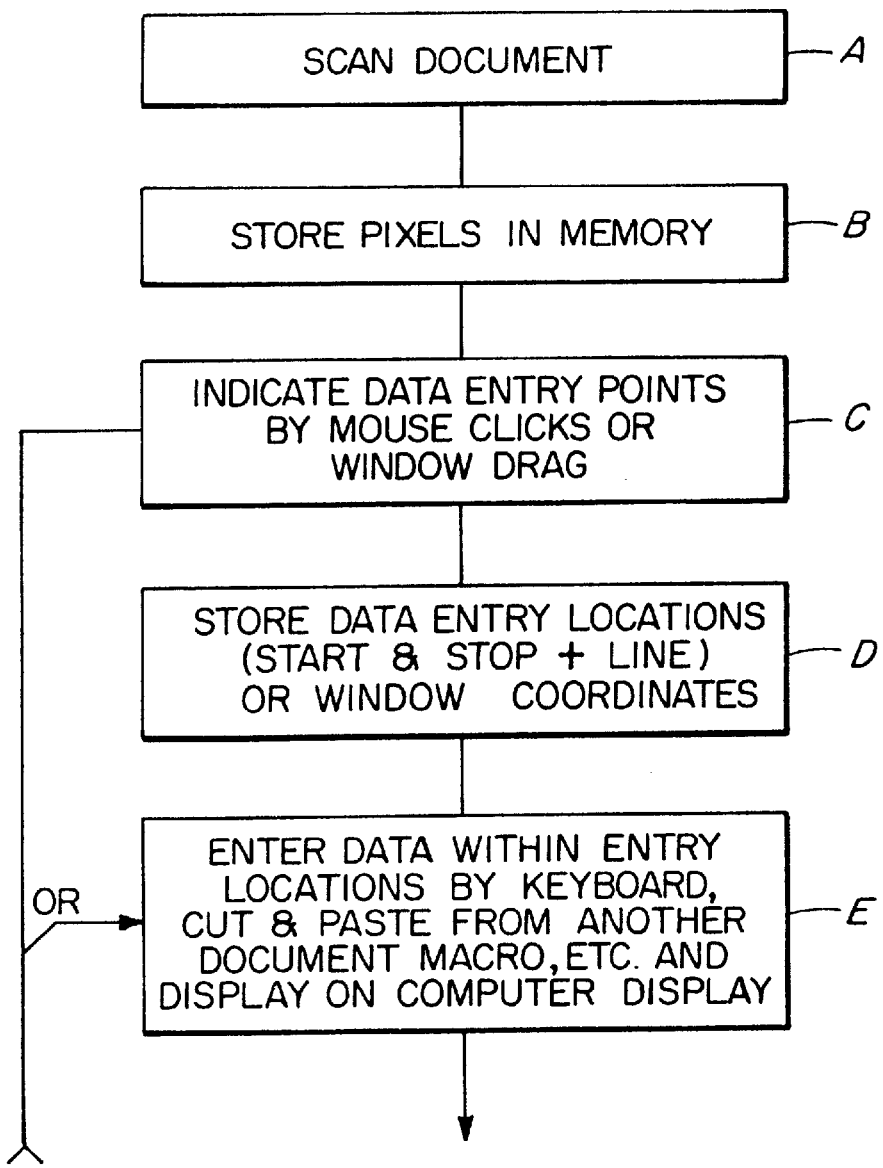
Figure 4:
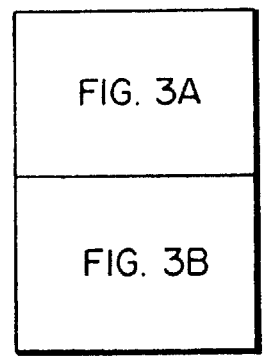

To operate the present invention, with reference to the flow chart shown in FIG. 3, a preprinted form is scanned by scanner 13 (step A), under control of a scanner control program and is stored in a memory such as memory 3 (step B). Pixel data resulting from the scan stored in the memory 17 is arranged in the memory in regular order defined by memory addresses, as shown in FIG. 2A, wherein each "X" represents data defining a pixel.

Once the form has been scanned and the pixel data stored, the user displays the scanned-in form on the computer display. Data entry spaces will be evident. As indicated in step C, if the data entry spaces are one line in height, the user, using a pointer such as a mouse, indicates the start and stop points of the entry spaces by "clicking" (depressing the mouse button) at the beginning and end of each of the pertinent entry spaces. The memory addresses of these start and stop points are then saved in memory as data entry coordinates. For example, the data can be stored as memory line addresses and coupled with X coordinate start and stop addresses.

Figure 2B:
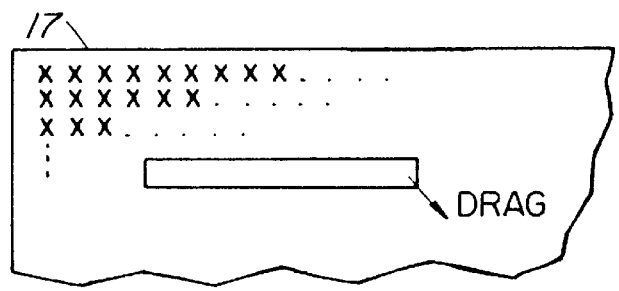

If the data entry spaces are more than one line in height, the user, using e.g. the mouse, can depress the mouse button and drag, from one corner of the data entry space to a corner which is diagonal therefrom, defining a window, as shown in FIG. 2B. The coordinates of the windows are then saved in memory, step D.

Alternatively, any other way of defining data entry spaces (or data entry windows) can be used.

The data entry spaces, either lines or windows, having been identified as noted above, can be automatically highlighted on the display, e.g. by bordering, by shading, by color, etc., to cause easier visual identification when the form is to be filled in. The entire form, and data entry space coordinate data and highlight style parameters can be saved in a file. The file can be called up later to accept data entry, or the form can be filled in at this stage.

The user then proceeds to enter data in the entry spaces shown on the display, step E. When data is entered, e.g. by keyboard, by cut and paste from another application, etc., the computer then recognizes the entry locations by noting the entry coordinates and by comparing against the stored coordinates. The entered data can then either be stored in separate memory locations, with the entry coordinates (eventually to be stored in a file, if desired), or can overwrite the memory at the locations storing the pixel data within the entry window, and subsequently be stored, step F. By recognizing the data entry locations, the computer can display the entered data on the computer display.

Rather than the data in the entry spaces being entered by keyboard or from another application, prestored data or derived data can be provided from a data base, from a macro, etc. For example, a user defines an entry space, and then defines its content by depressing a function key or control key and another predefined key (such as "D" for "date"). The computer enters a macro, a pointer to a macro, or a pointer to a database entry in memory, linked to the defined data entry space in the memory. When the form is displayed or printed, the macro automatically operates and/or the database entry is automatically entered into the entry space and printed as described herein. This is useful, for example, for entering a current date, a calculated date or number, a salutation, or any other data stored in the database or created by the macro, into entry spaces.

Any data entered into the data entry spaces or windows whether manually or by any other means should be construed to be "user entered data".

The computer then determines by either noting data entered into a dialog box or button displayed on the display, or by noting the operation of the mouse, whether the data entry has been complete. For example, if the user indicates a data entry space, then proceeds to fill in the data, the process returns to step C, allowing further data entry spaces to be indicated. If the user has entered data entry spaces but one or more have not been filled in, by noting that the user has begun entry of data in an unfilled data entry space, step E is entered. The computer can display a "done?" icon on the display, which when selected (step G) indicates that the user has finished indicating data entry spaces and filling them in with data.

In step H, the user indicates, in reply to the computer displaying a dialog box, whether the entire scanned document should be printed with the user entered data, or whether only the user entered data should be printed. While not shown, if the computer has not overwritten the memory at the data entry locations, the user can be asked whether a blank form should be printed.

Assuming that the user wishes to print only the user entered data on a preprinted form, the user inserts the preprinted form into the printer and turns on the printer, step I. The printer, on being turned on, registers the presumed top of the form page, and the computer notes the top of the scanned page, and stored coordinates. On command by the user, the computer drives the printer with data for printing at locations indicated by the coordinates of the entered data, i.e. in the data entry spaces, relative to the top and side of the form. Since the locations of the entered data correspond to the locations on the preprinted form, the printer is caused by the printer driver under control of the computer to print the entered data at the correct places, step J.

In case in step H the user has indicated that the entire scanned document with the entered data is to be printed, blank paper instead of the preprinted form is inserted into the printer, step K. The entire scanned document, including the user entered data is printed, step L, with the user entered data substituted for the scanned data within the data entry spaces. The user entered data can be obtained as the computer drives the printer and recognizes the data entry coordinates, then substitutes the stored data within these coordinates in place of the stored pixel data; alternatively if the user entered data has overwritten the memory, it can merely print out the data stored in the memory which will be the combination of both the scanned pixel data and the user entered data.

It may be seen that no programming has been necessary to be able to display a form to be filled in. The user entered data is entered easily on the computer, as easily as on a typewriter. The entire form can be printed, filled in with user data or not, or only the user information can be printed on a preprinted form, obtaining the advantages of both a typewriter and a computer. The blank form or the blank form with user entered data can also be stored for later use and/or printing.

The present invention can operate independently, or can form part of another method.

A person understanding this invention may now conceive of alternative structures and embodiments or variations of the above. All those which fall within the scope of the claims appended hereto are considered to be part of the present invention.

We claim:

1. A method of printing user data on a preprinted form comprising:

(a) scanning a preprinted form into a computer, and storing pixel data representing the form in a memory, (b) indicating and storing the coordinates of data entry spaces of the scanned form, (c) entering manually data into the computer at displayed locations within at least one of the indicated data entry spaces, and storing said data, (d) inserting said preprinted form into a printer, and (e) printing the entered data on the preprinted form within locations indicated by said coordinates.

2. A method as defined in claim 1, including the step of inserting a blank sheet of paper in the printer and printing both the scanned preprinted form and the user entered data on the paper.

3. A method as defined in claim 1, including the step of storing said data in association with said coordinates.

4. A method as defined in claim 3 including storing said data with pixel data of the scanned preprinted form, and overwriting pixel data in memory locations bound by said coordinates.

5. A method as defined in claim 1 in which said indicating step is comprised of pointing and clicking, using a computer pointing device, at beginning and end points of data entry locations on a displayed scanned image of the preprinted form on the computer display.

6. A method as defined in claim 1 in which said indicating step is comprised of dragging a pointing device over a data entry space to define boundaries of data entry locations on a displayed scanned image of the preprinted form on the computer display.

7. A method as defined in claim 5 including highlighting data entry spaces on the displayed scanned image of the preprinted form on the computer display, within bounds defined by said coordinates.

8. A method as defined in claim 1 including highlighting data entry spaces on the displayed scanned image of the preprinted form on the computer display, within bounds defined by said coordinates.

* * * * *